United States Patent
Assmundson

[11] Patent Number: 5,584,626
[45] Date of Patent: Dec. 17, 1996

[54] TORQUE-LIMITING FASTENING ELEMENT

[75] Inventor: Jarl Assmundson, Brussels, Belgium

[73] Assignee: Excelsior Development Inc., Wilmington, Del.

[21] Appl. No.: 490,888

[22] Filed: Jun. 15, 1995

[51] Int. Cl.$^6$ ............................. F16B 31/00; F16B 33/04
[52] U.S. Cl. ........................... 411/6; 411/1; 411/8
[58] Field of Search .................... 411/1–6, 8, 14

[56] References Cited

U.S. PATENT DOCUMENTS

| | | | |
|---|---|---|---|
| 3,237,507 | 3/1966 | Modrey | 411/8 |
| 3,841,177 | 10/1974 | Watterback | 411/1 X |
| 4,046,052 | 9/1977 | Nordstrom | 411/1 |

FOREIGN PATENT DOCUMENTS

| | | | |
|---|---|---|---|
| 1444276 | 7/1976 | United Kingdom | 411/1 |

*Primary Examiner*—Neill R. Wilson
*Attorney, Agent, or Firm*—Michael D. Bednarek; Kilpatrick & Cody

[57] ABSTRACT

The invention relates to a fastening element with a torque-limiting function, comprising on the one hand a fastening member (2, 2') with working threads (4), that is to say threads which are active for the fastening function of the element, and on the other hand a gripping member (3, 3') which is arranged so as to be capable of being turned with the aid of a spanner, wrench, screwdriver or other tool for attaching the fastening element (1, 1') and connected or connectable to the fastening member (2, 2') via a torque-transmitting threaded connection (5, 6/17, 18) with sufficient strength in order to be capable of transmitting to the fastening member torque of the size for which the fastening element is intended, and in which the gripping member is arranged to be unscrewed and turned relative to the fastening member, on attachment of the fastening element, only when the torque exceeds a given predetermined torque. The threads (5, 6/17, 18) in the torque-transmitting threaded connection are threaded in the opposite direction compared with the working threads (4).

11 Claims, 1 Drawing Sheet

TORQUE-LIMITING FASTENING ELEMENT

TECHNICAL FIELD

The invention relates to a fastening element with a torque-limiting function, comprising on the one hand a fastening member with working threads, that is to say threads which are active for the fastening function of the element, and on the other hand a gripping member which is arranged so as to be capable of being turned with the aid of a spanner, wrench, screwdriver or other tool for attaching the fastening element and connected or connectable to the fastening member via a torque-transmitting threaded connection with sufficient strength in order to be capable of transmitting to the fastening member torque of the size for which the fastening element is intended, and in which the gripping member is arranged to be unscrewed and turned relative to the fastening member, on attachment of the fastening element, only when the torque exceeds a given predetermined torque.

STATE OF THE ART

Fastening elements of the type indicated above are known from e.g. SE 365589 and SE 467797.

BRIEF DESCRIPTION OF THE INVENTION

The aim of the invention is to make available a fastening element which is improved in relation to known technology. More precisely, the invention aims to make available a fastening element which has at least one of the following improvements in relation to known technology:

possibility of forming a stop on the fastening member with a large stop surface in relation to the cross-section of the fastening member, possibility of forming a gripping member with a gripping width which is relatively small in relation to the cross-sectional dimensions of the fastening member and/or offering a construction which is advantageous from the manufacturing point of view.

At least one of these and other aims can be achieved with a fastening element which is characterized by what is indicated in the following patent claims. Further characteristics and aspects of the invention emerge from the following description of preferred embodiments.

SHORT DESCRIPTION OF THE FIGURES

In the following description of preferred embodiments, reference will be made to the attached drawing figures, in which FIG. 1 represents a side view of a torque screw together with a gripping mender according to a first preferred embodiment of the invention, FIG. 2 shows a modified embodiment of the fastening element according to FIG. 1, FIG. 3 shows a side view, partly in section, of a fastening element according to a second preferred embodiment of the invention, and FIG. 4 represents an end view IV—IV in FIG. 3.

DESCRIPTION OF PREFERRED EMBODIMENTS

Figure 1:
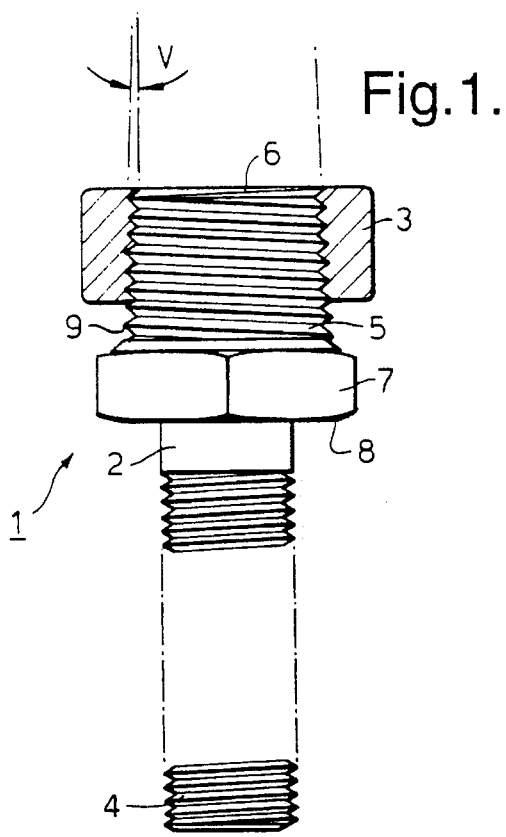

With reference first to FIG. 1, a fastening element is designated generally with the number 1. It consists of a fastening member in the form of a fastening screw 2 and a gripping member in the form of a torque nut 3. At one end, the fastening screw 2 has normally right-hand threaded working threads 4, i.e. threads which are active for the fastening of the element, and at the other end is a screw head 9. On the screw head 9 there are torque-transmitting outer threads 5 which are left-hand threaded and in the torque nut 3 there are corresponding torque-transmitting left-hand threaded threads 6. Between the region of the working threads 4 and the screw head 9 there is a flange 7 designed as a hexagonal gripping piece. At the same time, the gripping piece 7 functions as a stop and has on its underside a relatively large stop surface 8 intended to be pressed against the object which is to be fastened with the aid of the fastening element.

The screw head 9 is conical like the inside of the torque nut 3 and consequently also the threads 5, 6. The conicity is such that the imaginary point of the cone faces in the direction away from the working threads 4. The angle of inclination has been designated v.

The fastening element 1 thus described functions in the following manner. The torque nut 3 has at the manufacturer's been screwed firmly on the screw head 9, so hard that a given defined torque is required in order to be capable of unscrewing the torque nut 3 from the fastening screw 2. In use, the fastening element 1 functions initially as an integrated screw which is screwed firmly by means of the working threads 4 into a nut member (not shown), e.g. in order to fasten an object against the stop surface 8. The screwing is carried out with the aid of an adjustable spanner, fixed spanner, spanner, pipe wrench, multifix wrench or the like, which grips around the torque nut 3. When the fastening screw 2 has "bottomed" with the stop surface 8 against the object (not shown), the fastening element 1 is turned further until the predetermined torque is reached and exceeded, whereupon the torque nut 3 comes off the screw head 9. Because the threads 5, 6 of the torque nut 3 and of the screw head 9 are left-hand threaded, the torque nut 3, on continued turning, will move upwards, i.e. away from the working threads 4 of the fastening screw 2.

When the fastening screw 2 is to be unscrewed, the stop 7 is used as gripping piece for an adjustable spanner, fixed spanner or similar tool.

Figure 2:
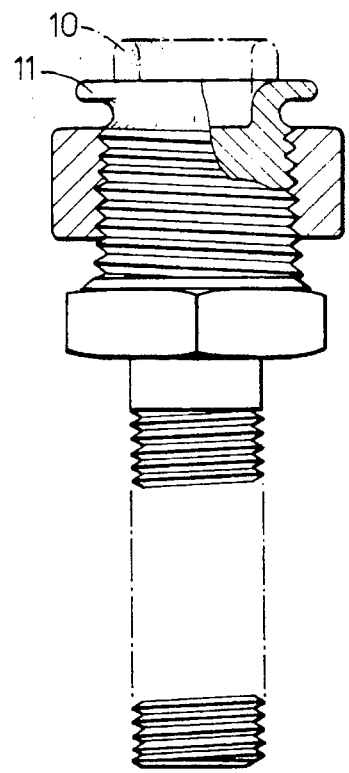

The embodiment according to FIG. 2 differs from the preceding only in that the fastening screw 2 has been provided with an axial, sleeve-shaped extension 10 which has then been upset outwards so that a collar 11 is formed which prevents the torque nut 3 leaving the fastening element when the torque nut 3 has been unscrewed.

Figure 3:
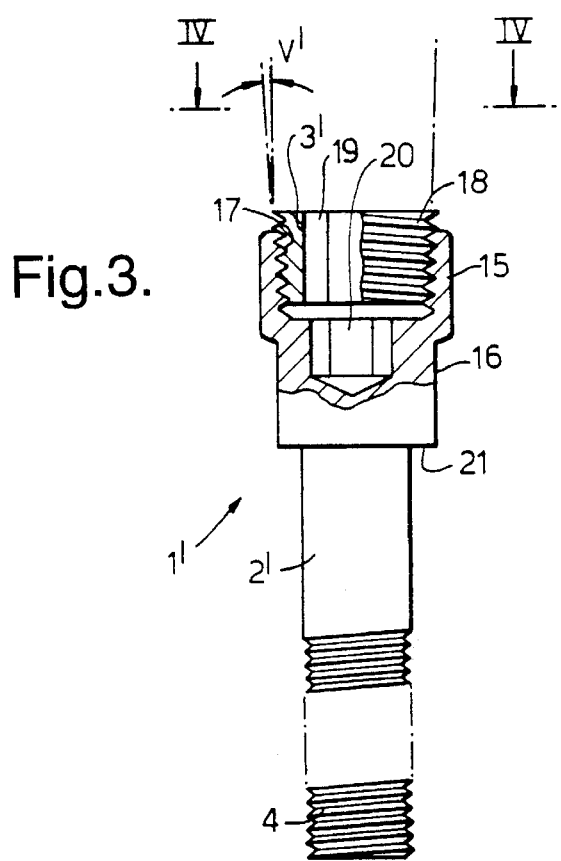
Figure 4:
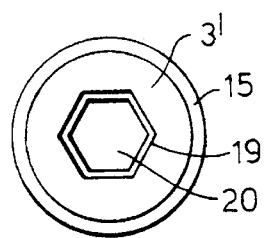

FIG. 3 illustrates an embodiment of a fastening element 1' with a fastening member in the form of a fastening screw 2' which at its one end is provided with conventional, right-hand threaded working threads 4. At the other end is a screw head 15 and a screw neck 16. In the screw head 15 are inner torque-transmitting, left-hand threaded threads 17 which interact with torque-transmitting outer, left-hand threaded threads on a torque screw 3'. The torque screw has a first hexagon socket 19 for a hexagon socket spanner for manoeuvring the integrated fastening element 1'.

In order to unscrew the fastening screw 2', there is in the screw neck 16 a second hexagon socket 20 which is coaxial with the first hexagon socket 19 in the screw head 15 so that a smaller hexagon socket spanner can be passed through the screw head 15 into the hexagon socket 20 in the screw neck 16. The screw neck 16 also functions as a stop and has on its underside a stop surface 21 facing the working threads 4 which can be pressed against an object on attachment of the fastening element 1'.

The torque screw 3' and its outer left-hand threaded threads 18 are conical like the internal shape of the corresponding nut member in the screw head 15 with its inner left-hand threaded threads 17. The angle of inclination of the cone has been designated v'. The conicity is furthermore such that the imaginary point of the cone faces in the direction towards the working threads 4 of the fastening screw 2'.

The fastening element 1' is handled and functions in a manner which is similar to that which has been described in connection with the embodiment according to FIG. 1. The torque screw 3' has at the manufacturer's been screwed firmly in the screw head 15 with such great force that a given defined torque is required to unscrew the torque screw 3' from its engagement with the screw head 15. The integrated fastening element 1' is screwed firmly by means of the working threads 4, in which connection use is made of a hexagon socket spanner which is arranged in the first hexagon socket 19 in the screw head 15. It will be understood that the fastening element 1' is suited for being capable of being arranged in, and in its totality for being capable of being countersunk in, a borehole. When the fastening element 1' has been screwed firmly so far that the stop/the screw neck 16 has bottomed, i.e. that the stop surface 21 has been brought to bear against a bearing surface, the fastening element 1' is tightened further with the aid of the hexagon socket spanner in the hexagon socket 19 until the predetermined torque is reached and exceeded. With this, the torque screw 3' is unscrewed from its engagement with the left-hand threaded inner threads 17 in the screw head 15. On continued turning, the torque screw 3' moves upwards, i.e. away from the working threads 4, after which no further torque can be transmitted to the fastening screw 2'.

When the fastening screw 2' is to be unscrewed, a smaller hexagon socket spanner is introduced into the inner hexagon socket 20 in the screw neck 16 and is turned.

I claim:

1. A threaded torque-limiting fastening element comprising:
    a fastening screw having spaced apart and oppositely-handed first and second sets of threads provided about an exterior thereof, said fastening screw having a flange portion provided thereon between said first and second sets of threads, said flange-being constructed and arranged to act as a stop to limit axial movement of said fastening screw; and
    a torque nut threaded onto said second set of threads, said torque nut being tightened onto said second set of threads with a torque sufficient to substantially fix said torque nut relative to said fastening screw, such that a torque for tightening said fastening screw applied to said torque nut causes said torque nut and said fastening screw to rotate in unison, wherein a torque for tightening said fastening screw applied to said torque nut in excess of a threshold torque causes said torque nut to rotate independently from said fastening screw.

2. A fastening element according to claim 1, wherein said flange portion is constructed and arranged to be gripped by a tool for turning said fastening screw.

3. A fastening element according to claim 1, wherein said fastening screw is provided with a second flange portion at least adjacent to said second set of threads, said second flange portion being constructed and arranged to restrict axial displacement of said torque nut relative to said fastening screw.

4. A fastening element according to claim 1, wherein a portion of said fastening screw on which said second set of threads is provided is conically tapered in a direction away from said first set of threads.

5. A fastening element according to claim 1, wherein a portion of said fastening screw on which said second set of threads is provided is conically divergent in a direction away from said first set of threads.

6. A fastening element according to claim 1, wherein said first set of threads is right-handedly threaded and said second set of threads is left-handed threaded.

7. A threaded torque-limiting fastening element comprising:
    a fastening screw having a first set of threads provided at least adjacent to a first end thereof, said fastening screw having a screw head at a second end thereof opposite said first end, said screw head having a bore formed therein and a second set of threads provided in said bore; and
    a torque screw having external threads therearound and being threadedly engaged with said second set of threads in said bore, said threads of said torque screw and said second set of threads being oppositely-handed to said first set of threads, said torque screw being tightened in said bore by a torque sufficient to substantially for said torque screw relative to said fastening screw, such that a torque for tightening said fastening screw applied to said torque screw causes said torque screw and said fastening screw to rotate in unison in a tightening direction of said fastening screw, wherein a torque for tightening said fastening screw applied to said torque screw in excess of a threshold torque causes said torque nut to rotate independently from said fastening screw,
    wherein said torque screw and said screw head are each provided with a portion constructed and arranged to receive a torque-applying tool.

8. A fastening element according to claim 7, wherein said second set of threads and said external threads are conically divergent in a direction along said fastening screw away from said first set of threads.

9. A fastening element according to claim 7, wherein said second set of threads and said external threads are conically tapered in a direction along said fastening screw towards said first set of threads.

10. A fastening element according to claim 7, wherein said first set of threads is right-handed and said second set of threads and said external threads are left-handed.

11. A fastening element according to claim 7, wherein at least one of said torque nut and said torque screw is provided with a hexagonal socket for receiving a torque-applying tool.

* * * * *